(12) United States Patent
Spratt (10) Patent No.: US 10,856,601 B2
(45) Date of Patent: Dec. 8, 2020

(54) PROTECTIVE SHIELD WITH ARCUATE LENS PORTION HAVING A HORIZONTALLY VARYING VERTICAL CURVATURE

(71) Applicant: Carl Zeiss Vision International GmbH, Aalen (DE)

(72) Inventor: Ray Steven Spratt, Petaluma, CA (US)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/227,226

(22) Filed: Dec. 20, 2018

(65) Prior Publication Data

US 2019/0116912 A1    Apr. 25, 2019

Related U.S. Application Data

(63) Continuation of application No. PCT/EP2017/066183, filed on Jun. 29, 2017, which is a continuation of application No. PCT/US2016/040433, filed on Jun. 30, 2016.

(51) Int. Cl.
*A42B 3/22* (2006.01)
*G02C 7/16* (2006.01)
*G02C 7/02* (2006.01)

(52) U.S. Cl.
CPC .................. *A42B 3/22* (2013.01); *G02C 7/02* (2013.01); *G02C 7/16* (2013.01)

(58) Field of Classification Search
CPC .. A42B 3/22; A42B 3/20; A42B 3/221; G02C 7/02; G02C 7/16

USPC ................................................ 2/424, 15, 6.3
See application file for complete search history.

(56) References Cited

U.S. PATENT DOCUMENTS

| | | | | |
|---|---|---|---|---|
| 1,741,536 A | * | 12/1929 | Rayton | G02C 7/02 351/159.01 |
| 5,604,547 A | * | 2/1997 | Davis | A61F 9/02 351/159.2 |
| 5,722,091 A | | 3/1998 | Keller et al. | |

(Continued)

FOREIGN PATENT DOCUMENTS

| | | | | |
|---|---|---|---|---|
| CA | 2668395 A1 | * | 12/2009 | ............ A42B 3/185 |
| EP | 1031063 A1 | | 8/2000 | |

(Continued)

OTHER PUBLICATIONS

Ophthalmic optics—Spectacle lenses—Vocabulary (ISO 13666:2012); German and English version EN ISO 13666:2012, Oct. 2013.

(Continued)

*Primary Examiner* — Alissa L Hoey
(74) *Attorney, Agent, or Firm* — Thrive IP®; Georg M. Hasselmann (57) ABSTRACT

A protective shield can be mounted in front of the face of a wearer of a protective helmet. In an as worn orientation, the protective shield extends across the eyes and typically also across the nose of the wearer. The protective shield has at least one arcuate lens portion which, in the as worn orientation, curves across an eye of the wearer. The arcuate lens portion has a horizontal curvature extending in a horizontal direction and a vertical curvature extending in a vertical direction, wherein the vertical curvature is a horizontally varying vertical curvature ($\kappa$).

19 Claims, 6 Drawing Sheets

(56) References Cited

U.S. PATENT DOCUMENTS

| | | | | |
|---|---|---|---|---|
| 5,748,264 A | * | 5/1998 | Hegg | G02B 27/0172 348/746 |
| 5,774,201 A | * | 6/1998 | Tackles | G02C 7/02 351/159.01 |
| 5,825,455 A | * | 10/1998 | Fecteau | A61F 9/028 351/159.2 |
| 6,038,705 A | | 3/2000 | Jarvis | |
| 6,454,408 B1 | | 9/2002 | Morris et al. | |
| 6,715,150 B1 | * | 4/2004 | Potin | A42B 3/22 2/15 |
| 6,789,896 B2 | | 9/2004 | Morris et al. | |
| 7,073,208 B2 | * | 7/2006 | Penque, Jr. | A61F 9/028 2/431 |
| 7,551,360 B2 | * | 6/2009 | Reichow | A42B 3/225 2/424 |
| 7,850,303 B2 | * | 12/2010 | Reichow | A42B 3/225 2/425 |
| 8,813,270 B2 | * | 8/2014 | Pizzi | A42B 3/223 2/425 |
| 2003/0169398 A1 | * | 9/2003 | Perrott | G02C 5/00 351/41 |
| 2006/0000011 A1 | | 1/2006 | Reichow et al. | |
| 2008/0074610 A1 | | 3/2008 | Tackles | |
| 2009/0126063 A1 | * | 5/2009 | Brown | A42B 3/20 2/12 |
| 2013/0318691 A1 | * | 12/2013 | Krick | A42B 3/221 2/425 |
| 2015/0121611 A1 | * | 5/2015 | Isabelle | A61F 9/02 2/439 |
| 2015/0241716 A1 | | 8/2015 | Chen | |
| 2016/0286890 A1 | * | 10/2016 | Morin | A42B 3/221 |
| 2018/0049507 A1 | * | 2/2018 | McCashin | A42B 3/003 |
| 2019/0121164 A1 | * | 4/2019 | Grasso | G02C 7/102 |

FOREIGN PATENT DOCUMENTS

| | | | |
|---|---|---|---|
| WO | 99/63392 A1 | 12/1999 | |
| WO | WO-2017191493 A1 * | 11/2017 | G02C 1/00 |

OTHER PUBLICATIONS

International Search Report for PCT/EP2017/066183, to which this application claims priority, dated Oct. 4, 2017.

International Preliminary Report on Patentability for PCT/EP2017/066183, to which this application claims priority, dated Jul. 4, 2018.

* cited by examiner

PROTECTIVE SHIELD WITH ARCUATE LENS PORTION HAVING A HORIZONTALLY VARYING VERTICAL CURVATURE

CROSS REFERENCE TO RELATED APPLICATIONS

This application is a continuation application of international application PCT/EP2017/066183, filed Jun. 29, 2017, which is a continuation application of international application PCT/US2016/040433, filed Jun. 30, 2016, both of which are hereby incorporated by reference in their entireties.

TECHNICAL FIELD

The present disclosure relates to protective gear and in particular to a protective (piano) shield for mounting in front of a face of a wearer, with the shield extending across the eyes of the wearer. Further, the present disclosure relates to a protective helmet, in particular a sports helmet such as a hockey helmet.

BACKGROUND

In recent years, the use of protective gear for avoiding sports-related injuries has become more and more popular. There is a need for eye and face protection for people who participate in sports or other activities that can potentially damage the eyes or other facial structures. For example, face or eye injuries (sometimes leading to loss of vision) can occur in sports such as hockey and football in which objects (such as sticks or pucks) or opponents can strike a participant's eye, nose, teeth, or other parts of the face. Protective shields are also used for a variety of non-sports-related tasks such as in the construction industry or in the medical field. Awareness of potentially infectious body fluids has also prompted many healthcare professionals to wear protective eyewear or face shields when treating patients to avoid accidental infections.

A particular example of protective sports equipment is an ice hockey helmet having a shield or visor attached to the front of the helmet to reduce potential injury of the face and eyes. Hockey visors are clear protective shields that sit away from the wearer's face and are attached to a side or forehead region of the helmet.

In this context, US 2006/0000011 A1 discloses an optically decentered face shield. The shield shown therein has a toroidal lens having a first radius of curvature in a horizontal meridian and a second (different) radius of curvature in the vertical meridian. The face protector includes a one piece shield in which an optical center is displaced away from the normal straight ahead line of sight toward an activity specific line of sight to minimize image shift that occurs when a direction of gaze passes across the edge of the shield. For example, a hockey player's gaze can shift between the lens and an ice surface, e.g., to view a hockey puck. The object of US 2006/0000011 A1 is minimizing image shift. Furthermore, U.S. Pat. No. 5,722,091 discloses protective equipment for the pilot of a military aircraft and a method of personalizing the equipment. The object of U.S. Pat. No. 5,722,091 is providing protection against laser attacks. US 2015/0241716 A1 discloses a protective lens for people with presbyopia.

SUMMARY

It is an object of the present disclosure to provide an improved protective shield, helmet, and corresponding method for designing a protective shield. It would be advantageous to achieve a protective shield that provides one or more advantages such as sufficient impact protection with manufacturability, compactness and/or appealing design.

To better address one or more of these concerns, according to a first aspect of the disclosure, a protective shield is provided for mounting in front of a face of a wearer in an as worn orientation, with the shield extending across the eyes of the wearer. The protective shield comprises
  at least one arcuate lens portion that, in the as worn orientation, curves across an eye of the wearer, the arcuate lens portion having a first, horizontal curvature extending in a horizontal direction and a second, vertical curvature extending in a vertical direction (wherein the respective curvatures refer to a curvature of a front surface or back surface of the arcuate lens portion);
  wherein the second, vertical curvature is a horizontally varying vertical curvature. Advantageously, there is provided a single arcuate lens portion that curves across the eyes and nose of the wearer.

The basic idea of the disclosure is to modify the shape of the protective shield, more precisely to provide a protective shield whose vertical curvature varies as a function of a horizontal location along the shield.

Current shields are generally toroidal in shape, with two distinct variations. A first type of shield has a cylindrical shape, i.e., the shield is flat in the vertical direction. A disadvantage of this design is they have more optical distortion than toroidal shields because of the larger differences in curvatures along the two meridians and because they are more likely to flex. A further disadvantage can be a limited structural impact resistance such that a rather thick shield may be required. A second type of shield, as for example described in the afore-mentioned US 2006/0000011 A1, describes a toroidal lens having a first radius of curvature in a horizontal meridian and a second (different) radius of curvature in a vertical meridian. The shield is thus also curved in a vertical direction, concave outward with a fixed radius of curvature.

The proposed protective shield follows a different approach in that the at least one arcuate lens portion is provided with a horizontally varying vertical curvature. In other words, a protective shield is provided whose vertical curvature varies as a function of horizontal location or angle. For example, an optically and structurally appropriate curvature can be provided in a central region of the lens portion which makes the shield structurally stronger and may also reduce optical distortion for the wearer, the vertical curvature of which may flatten toward the temporal edges where it attaches to the helmet. The proposed solution thereby allows for structural integrity, good optics in front of the eye, and easy mating to the helmet. Hence, high impact protection can be ensured in particular in a central region, and the vertical curvature in a side region can advantageously be adapted to correspond to an adjacent structural element such as a side of a helmet.

It has been found that in certain applications a maximum impact protection is not necessarily required from all directions. Hence, it can be sufficient to provide a structurally appropriate vertical curvature not over the entire lens portion but only in certain horizontal locations. For example, a maximum impact may result from an impact on the protective shield from straight-ahead. In this case, it can be sufficient to provide a structurally appropriate vertical curvature for an even higher degree of protection in the straight-ahead direction, whereas a reduced vertical curvature can be sufficient to provide protection from an impact originating from a different horizontal direction. In other words, a sufficient degree of impact protection can be ensured from all sides and an even higher degree of protection can be provided, for example, in the straight ahead direction.

In related art solutions a varying thickness is sometimes provided in a horizontal direction, wherein the thickest portion is provided in a central region of the lens of the protective shield. The solution proposed herein can in addition exploit the benefits of the arc-like structure provided by a vertical curvature to strengthen the protective shield. However, a variable vertical curvature is provided which varies with horizontal position and/or angle. Thereby, since the vertical curvature changes with horizontal position, further advantages can be provided such as naturally mating with a side of the helmet for ease of manufacturing. Advantageously a more compact and also visually appealing design can be provided in that the vertical curvature is reduced, for example in a side region of the protective shield, where only a reduced impact resistance may be required.

According to a second aspect of the disclosure, there is provided a protective helmet comprising the aforementioned protective shield with the arcuate lens portion. In an exemplary embodiment, the protective helmet can be a sports helmet, typically a hockey helmet, for example an ice hockey helmet.

According to a third aspect of the disclosure, there is provided a method, in particular a computer-implemented method, for designing a protective shield for mounting in front of a face of a wearer in an as worn orientation, with the shield extending across the eyes of the wearer, wherein the shield comprises at least one arcuate lens portion, the method comprising the steps of:

determining a vertical plane and a horizontal plane of the protective shield in an as worn orientation;

designing the at least one arcuate lens portion such that, in the as worn orientation, curves across an eye of the wearer, the arcuate lens portion having a first, horizontal curvature extending in a horizontal direction and a second, vertical curvature extending in a vertical direction (wherein the respective curvatures refer to a curvature of a front surface or back surface of the arcuate lens portion); and determining the vertical curvature such that the vertical curvature is a horizontally varying vertical curvature.

According to a fourth aspect of the disclosure, there is provided a, in particular non-transitory, computer program product comprising program code means for causing a computer to carry out the steps of the method according to the third aspect or one of its refinements when the computer program is carried out on the computer.

According to a fifth aspect of the disclosure, there is provided a machine readable storage medium having stored thereon a computer program comprising program code means for carrying out the steps of the method according to the third aspect or one of its refinements.

Exemplary embodiments of the disclosure are described below. It shall be understood that the protective helmet, method, computer program, and medium for the protective shield can have similar and/or identical refinements or exemplary embodiments as the disclosed protective shield.

Thus, the object as laid out above is solved entirely.

In the following, some terms which are used throughout the application, shall be shortly explained and defined:

The term "curvature" as used herein may refer to curvature of the front surface or back surface of the arcuate lens portion. It shall be understood that front and back surfaces can have different curvatures such as different horizontal curvatures. Further, a variation in the vertical curvature can be different or slightly different for the front and surfaces of the arcuate lens portion. The vertical curvature can refer to a curvature of the front surface or back surface of the arcuate lens portion. The horizontal curvature can refer to a curvature of the front surface or back surface of the arcuate lens portion.

The term "normal line of sight" (NLOS) as used herein may refer to a fixed line of sight that projects forward from each eye when the eyes are fixed to a distant point. The NLOS can refer to the line of sight of a single eye or of both eyes. The direction of gaze is normally maintained in the same direction by brainstem reflexes to avoid diplopia. The NLOS of the two eyes extend in a generally horizontal plane through the eyes when the head is in an upright with the eyes staring into the distance.

The terms "horizontal plane" or "vertical plane" refer to horizontal and vertical planes when the head is in an upright position.

Unless otherwise indicated, the terminology used in the context of the present application corresponds to the definitions in the standard DIN EN ISO 13666: 2013-10 of the Deutschen Institut für Normung e.V. (DIN).

The term optical axis shall refer to a straight line, perpendicular to both optical surfaces of a spectacle lens, along which light can pass undeviated, cf. No 4.8 of the standard DIN EN ISO 13666.

The term vertex shall refer to a point of intersection of the optical axis with a surface of a lens, cf. No 4.9 of the standard DIN EN ISO 13666.

A meridian (of a surface) shall refer to any plane which contains the center(s) of curvature of a surface, cf. No 5.7.1 of the standard DIN EN ISO 13666. A meridian (of a lens) shall refer to any plane which contains the optical axis of a lens, cf. No 5.7.2 of the standard DIN EN ISO 13666.

The term front surface shall refer to that surface of the lens portion intended to be fitted away from the eye, cf. No 5.8 of the standard DIN EN ISO 13666.

The term back surface shall refer to that surface of the lens portion intended to be fitted nearer to the eye, cf. No 5.9 of the standard DIN EN ISO 13666.

The term afocal lens or plano lens shall refer to a lens with nominally zero dioptric power cf. No 8.2.3 of the standard DIN EN ISO 13666. Correspondingly, an afocal lens portion or plano lens portion refers to a lens portion with nominally zero dioptric power. As used herein, nominally zero dioptric power can refer to a dioptric power of less than 0.12 dptr, typically less than 0.09 dptr, more typically less than 0.06 dptr.

The term optical center shall, for practical purposes, refer to the intersection of the optical axis with the front surface of a lens, cf. No 5.10 of the standard DIN EN ISO 13666.

The term primary position shall refer to a position of the eye relative to the head, looking straight ahead at an object at eye level, cf. No 5.31 of the standard DIN EN ISO 13666.

The term line of sight shall refer to a line joining the center of the fovea to the center of the exit pupil of the eye, and its continuation from the center of the entrance pupil forward into object space, cf. No 5.32 of the standard DIN EN ISO 13666. This can also be referred to as the visual axis.

The term optical material shall refer to a transparent material capable of being manufactured into optical components, cf. No 6.1 of the standard DIN EN ISO 13666.

The term cylindrical surface shall refer to a part of the inside or outside surface of a cylinder, cf. No 7.2 of the standard DIN EN ISO 13666.

The term principal meridians (of a surface) shall refer to those meridians of a surface which show the maximum and minimum curvatures on measurement, cf. No 7.4 of the standard DIN EN ISO 13666.

The term toroidal surface shall refer to a surface having mutually perpendicular principal meridians of unequal curvature, of which the cross-section in both principal meridians is nominally circular, cf. No 7.5 of the standard DIN EN ISO 13666. A toroidal surface is thus part of a surface generated by a circular arc rotating about an axis which is in the same plane as the arc but which does not pass through its center of curvature. It is desirable to restrict the term "toroidal" to a surface and the term "toric" to a lens or object.

In mathematical terms, a toroid can be seen as a surface of revolution with a hole in the middle, like a doughnut. The axis of revolution passes through the hole and so does not intersect the surface. For example, when a rectangle is rotated around an axis parallel to one of its edges, then a hollow rectangle-section ring is produced. In this case, the edges parallel to the axis of rotation form a cylinder. If the revolved figure is a circle, then the object is called a torus.

The term protective lens or shield shall refer to a lens or shield designed to protect the eye from external hazards, cf. No 8.14 of the standard DIN EN ISO 13666.

The term diopter shall refer to a unit of focusing power of a lens or surface, or of vergence (refractive index divided by the radius of curvature) of a wavefront, cf. No 9.1 of the standard DIN EN ISO 13666. Commonly used symbols for diopter are D and dpt. Diopters are expressed in reciprocal meters ($m^{-1}$).

The term "as-worn" position shall refer to a position and orientation of the lens or spectacles relative to the eyes and face during wear, cf. No 9.15 of the standard DIN EN ISO 13666

In an exemplary embodiment of the protective shield according to the first aspect, the arcuate lens portion is adapted to curve across the eyes and nose of the wearer. Advantageously in the as worn orientation, the arcuate lens portion curves across the eyes and nose of the wearer. An advantage of this embodiment is that a single arcuate lens portion may be provided for protective purposes that curves across the eyes and nose of the wearer. Hence, no separate connecting portions such as a nose bridge for two separate arcuate lens portions are required.

In a further exemplary embodiment, the protective shield is further adapted for use in a protective helmet, typically a sports helmet, more typically a hockey helmet; the helmet having left and right temporal sides; wherein the arcuate lens portion is a single arcuate lens portion that, in the as worn orientation, curves across the eyes and nose of the wearer and extends towards the left and right temporal sides of the helmet. A maximum vertical curvature can be provided in a central region of the arcuate lens portion in particular in a center in horizontal direction, in the as worn orientation, and the vertical curvature can vary horizontally in particular reduce or flatten towards the left and right sides in the as worn orientation. Advantageously, the vertical curvature at the left and right temporal sides may flatten such that it corresponds to a curvature of the helmet at the left and right temporal sides such that the protective shield accurately fits with the helmet.

In a further exemplary embodiment, the arcuate lens portion can be a plano or afocal lens portion. Hence, the arcuate lens portion provides nominally zero dioptric power. Curvature variations occur (more or less) the same on both the front surface and the back surface.

In an exemplary embodiment of the protective shield according to the first aspect, the vertical curvature decreases horizontally from a central region of the arcuate lens portion towards a temporal side region in the as worn orientation. In other words, the vertical curvature flattens from center to edge. An advantage of this embodiment is that an optically and structurally appropriate curvature can be provided in a central region of the arcuate lens portion which flattens towards the temporal edges where it attaches to the helmet.

In an exemplary embodiment of the protective shield according to the first aspect, the vertical curvature varies horizontally along an intersection curve of the arcuate lens portion and a horizontal plane which, in the as worn orientation, comprises the eyes of the wearer. In other words, the vertical curvature varies in a horizontal direction along the intersection curve at the height of the eyes, i.e. in a see-through portion of the arcuate lens portion and not just in a boundary or fixation region. Alternatively, the term horizontal can refer to the zero degree meridian going through the optical center of the lens or arcuate lens portion of the shield. The vertical curvature can thus vary horizontally along the zero degree meridian going through the optical center of the lens or arcuate lens portion of the shield.

In a further exemplary embodiment of the protective shield according to the first aspect, the vertical curvature varies horizontally along the intersection curve as a function of a horizontal angle between a surface normal of the arcuate lens portion on the intersection curve and a horizontal line of sight of an eye of the wearer in a primary position. As defined above, the term primary position shall refer to a position of the eye relative to the head, looking straight ahead at an object at eye level. The angle or horizontal angle as used herein is the angle between (a) a surface normal of the arcuate lens portion at a particular position on the intersection curve and (b) the horizontal line of sight of the eye of the wearer. Hence, a center of the protective shield, such as the vertex of the protective shield, can be defined as having an angle of 0°, which increases towards the right side along the intersection curve and decreases towards the left side along the intersection curve. Hence, for each point on the intersection curve a horizontal angle can be determined and the vertical curvature of the arcuate lens portion varies as a function of this horizontal angle. Advantageously, the vertical curvature varies symmetrically in left and right direction such that the vertical curvature varies horizontally as a function of an absolute value of the horizontal angle. Alternatively, the vertical curvature can vary horizontally along the intersection curve as a function of a horizontal angle between a surface normal of the arcuate lens portion in the horizontal plane and the horizontal meridian. A horizontal angle as defined based on the surface normal can typically reach up to ±90° for a practical and moldable shield.

In an exemplary embodiment of the protective shield according to the first aspect, the vertical curvature at a horizontal position on the intersection curve is the curvature of the arcuate lens portion in a plane to the horizontal plane which is (a) orthogonal to the horizontal plane and (b) contains the surface normal of the arcuate lens portion on the intersection curve.

In an exemplary embodiment of the protective shield according to the first aspect, the vertical curvature of the arcuate lens portion varies by at least 0.5 dptr, typically by at least 1 dptr, more typically by at least 2 dptr. In other words, a total magnitude of the variation of the vertical curvature, in particular along the intersection curve, may vary horizontally at least by the values specified herein.

In an exemplary embodiment of the protective shield according to the first aspect, the vertical curvature of the arcuate lens portion varies linearly with angle or quadratic with angle or cubic. It will be appreciated that the horizontal variation of the vertical curvature may also follow other shapes or profiles as required by the given application. Advantageously, the curvature decreases as the cube of the angle. An advantage of this embodiment is that distortions which may be caused by a small misalignment between a front and a back surface with abruptly changing curvatures can be avoided.

In an exemplary embodiment of the protective shield according to the first aspect, the arcuate lens portion comprises a central region having a substantially constant vertical curvature. For example, the arcuate lens portion can have a constant or substantially constant vertical curvature over a horizontal angle of ±20°, typically ±45°, more typically ±60°, even more typically ±90°. An advantage of this embodiment is that an optical optimization can be simplified if the curvature changes of the vertical curvature are far enough out in the periphery. In particular, an undistorted view in a central region along a line of sight of the wearer may be provided. The given angular regions can refer to a horizontal eye rotation angle of the wearer in an as worn orientation with respect to a straight ahead line of sight, which is a more natural definition of the angle for the wearer. In a further example, the arcuate lens portion can have a constant or substantially constant vertical curvature over a horizontal angle of ±20°, typically ±30°, more typically ±60°, even more typically ±80°. In this example, the given angular region can refer to a horizontal angle between (a) a surface normal of the arcuate lens portion at a particular position on the intersection curve and (b) the horizontal line of sight of the eye of the wearer.

In an exemplary embodiment of the protective shield according to the first aspect, the vertical curvature can vary horizontally within a field of view region of the wearer. In other words, the vertical curvature varies horizontally within the field of view of the wearer and not just far out in the periphery. Hence, a variation of the vertical curvature occurs in a section of the arcuate lens portion that the wearer can see through in an as worn orientation. This means, that a variation of the vertical curvature is provided in an optical part that the wearer can see through and not just in, for example, an attachment extension which does not need to be optically correct. In other words, a vertical curvature variation is provided in a visual zone that the wearer can see through. A visual zone can also refer to a field of view region having a horizontal angle of typically ±60°, more typically ±80°, even more typically ±100°. The horizontal angle can again refer to the horizontal eye rotation angle of the wearer with respect to a straight ahead line of sight.

In an exemplary embodiment of the protective shield according to the first aspect, the arcuate lens portion comprises a flat horizontal edge, typically having a vertical curvature of less than ±0.5 dptr, more typically of less than ±0.25 dptr, even more typically a flat horizontal edge having zero curvature. An absolute value of the vertical curvature at a horizontal edge of the arcuate lens portion can thus be typically less than 0.5 dptr (corresponding to a radius of curvature of 2 m), more typically less than 0.25 dptr (corresponding to a radius of curvature of 4 m). An advantage of this exemplary embodiment is that the arcuate lens portion of the protective shield can fit with a substantially flat side of a protective helmet.

In an exemplary embodiment of the protective shield according to the first aspect, the arcuate lens portion provides a maximum back vertex power of less than ±0.12 dptr, typically less than ±0.09 dptr, more typically less than ±0.06 dptr. An absolute value of a maximum optical through power in a field of view region of the wearer can be typically less than 0.12 dptr, more typically less than 0.09 dptr, even more typically less than 0.06 dptr. An advantage of this exemplary embodiment is that an excessive optical distortion can be avoided. This maximum value can refer to a value in a particular point of the arcuate lens portion or alternatively any point in a field of view region. In particular, the arcuate lens portion provides a maximum optical through power of less than one of the aforementioned values in a region as specified in the Canadian standard Z262.2-09. The Canadian standard Z262.2-09 specifies this region based on eye rotation angle measured from the center of the eyes. The optical power can be measured as specified in DIN EN ISO 13666, in particular in section No. 8.5 regarding the measurement of spectacle lens dioptric properties.

In an exemplary embodiment of the protective shield according to the first aspect, the arcuate lens portion provides an astigmatism of less than 0.12 dptr, typically less than 0.09 dptr, more typically less than 0.06 dptr. In this context, astigmatism is an absolute value, i.e., a magnitude. An advantage of this exemplary embodiment is that an excessive optical distortion can be avoided.

In an exemplary embodiment of the protective shield according to the first aspect, the arcuate lens portion is made of a transparent impact resistant material, typically made of polycarbonate. However, it will be appreciated that also any other suitable material providing a transparent impact resistance arcuate lens portion for the protective shield can be used.

It is to be understood that the features mentioned above and those yet to be explained below may be used not only in the combination respectively indicated, but also in other combinations or separately, without departing from the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
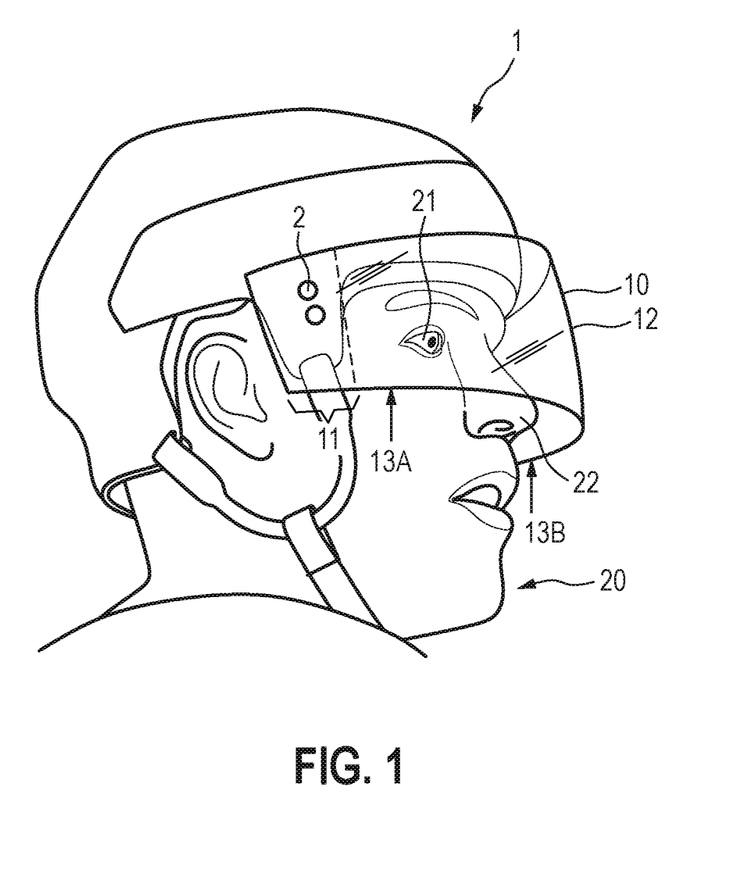
FIG. 1 shows a perspective view of a protective shield mounted to a helmet.

FIG. 1 shows a perspective view of a protective shield 10 mounted to a helmet 1. In the shown example, the protective shield 10 is a hockey visor which can be mounted to a protective sports helmet 1 by retention or mounting elements 2 such as mounting pins, hooks, straps, screws or the like. In an exemplary embodiment, the protective shield 10 provides a mounting section 11, in particular a non-optical mounting element, for engaging with the corresponding retention elements 2 of the helmet 1.

Figure 4A:
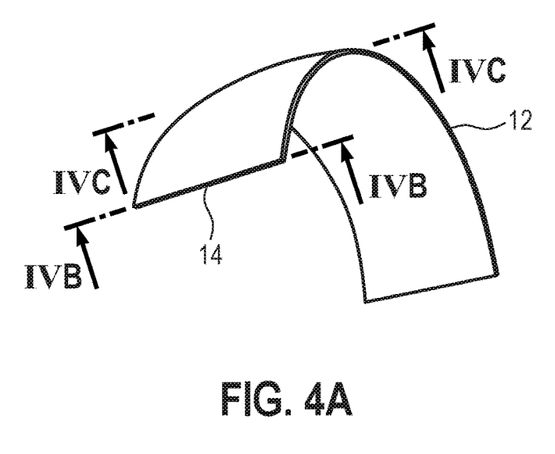
FIG. 4A shows a perspective view of a protective shield according to an aspect of the present disclosure.

As shown in FIG. 1, an arcuate lens portion 12 of the protective shield curves across the eyes 21 and nose 22 of the wearer. In the shown exemplary embodiment, the protective shield 10 is adapted for use with a protective helmet 1, here a hockey helmet for ice hockey, the helmet having a right temporal side 13A and a left temporal side 13B, wherein the arcuate lens portion 12 is a single arcuate lens portion that, in the shown as worn orientation, curves across the eyes 21 and advantageously also across the nose 22 of the wearer 20 and extends towards the left and right temporal sides 13A, 13B of the helmet 1, where it is attached to the helmet by retention elements 2. The vertical curvature of the arcuate lens portions varies horizontally as will be explained further below in particular with reference to FIG. 4 and the following.

Figure 2A:
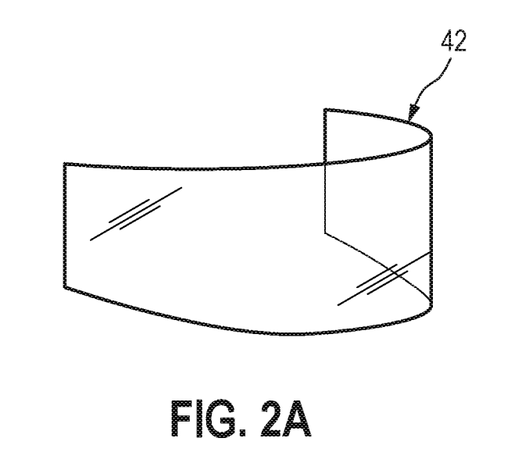
FIG. 2A shows a perspective view of a cylindrical protective shield.
Figure 2B:
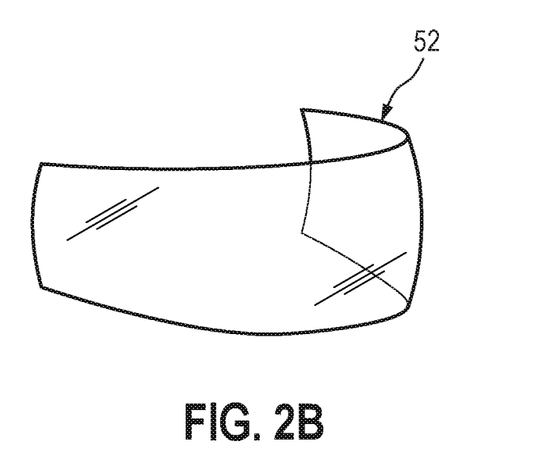
FIG. 2B shows a perspective view of a toroidal protective shield.

FIGS. 2A and 2B show a cylindrical protective shield 42 and toroidal protective shield 52 respectively.

The cylindrical protective shield 42 as shown in FIG. 2A is a cylinder section with no vertical curvature extending in a vertical direction in an as worn orientation. On the other hand, the toroidal protective shield 52 as shown in FIG. 2B provides, in the as worn orientation, a first, horizontal curvature extending in a horizontal direction and a second, vertical curvature extending in vertical direction. In both cases, in contrast to the solution according to the present disclosure, there is no horizontally varying vertical curvature.

Figure 3A:
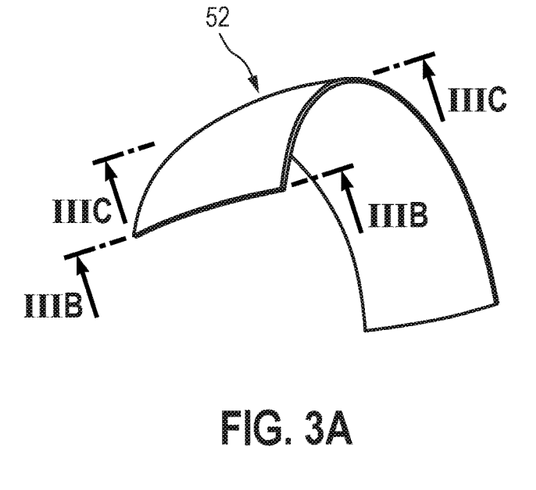
FIG. 3A shows a further perspective view of a toroidal protective shield.
Figure 3B:
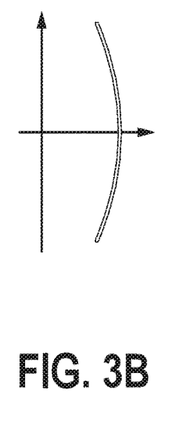
FIG. 3B shows a vertical cross-sectional view of the protective shield of FIG. 3A along line IIIB-IIIB in a vertical plane at a side of the protective shield.
Figure 3C:
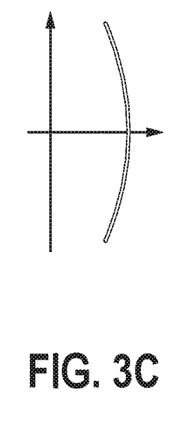
FIG. 3C shows a vertical cross-sectional view of the protective shield of FIG. 3A along line IIIC-IIIC in a vertical plane at a center of the protective shield.

As illustrated in more detail by FIG. 3A to FIG. 3C, a toroidal protective shield comprising a toroidal arcuate lens portion provides a constant curvature in the vertical direction. The vertical cross-sectional view at an edge of the toroidal arcuate lens portion 52 of FIG. 3A along line IIIB-IIIB as illustrated in FIG. 3B thus shows the same vertical curvature as the vertical cross-sectional view at a center of the toroidal arcuate lens portion 52 along line IIIC-IIIC as illustrated in FIG. 3C. It should be noted that an advantage of such a toroidal shape is easy manufacturing, since only one horizontal and one vertical curvature is required for the front and back surfaces, respectively.

Figure 4B:
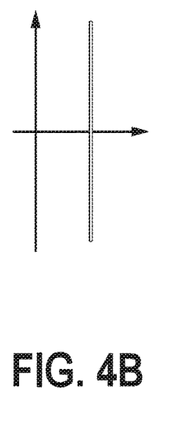
FIG. 4B shows a vertical cross-sectional view of the protective shield of FIG. 4A along line IVB-IVB in a vertical plane at a side of the protective shield.

FIG. 4A shows a perspective view of an arcuate lens portion 12 according to an aspect of the present disclosure that, in the as worn orientation, curves across an eye of the wearer, the arcuate lens portion 12 having a first, horizontal curvature extending in a horizontal direction and a second, vertical curvature extending in a vertical direction, wherein the second, vertical curvature is a horizontally varying vertical curvature. In other words, in contrast to the toroidal shape as illustrated with respect to FIG. 2B and FIG. 3A to 3C, the vertical curvature is not constant in a horizontal direction. In a preferred exemplary embodiment, the arcuate lens portion 12 comprises a substantially flat horizontal edge or temporal side portion 14, in particular having a zero vertical curvature, as shown by the vertical cross-sectional view along line IVB-IVB in FIG. 4B. An advantage of such a flat horizontal edge is that it can easily match the shape of the helmet in the area where the protective shield connects to the helmet. A temporal edge of the arcuate lens portion 12 of the protective shield 10 thereby accurately fits with the helmet 1.

Figure 4C:
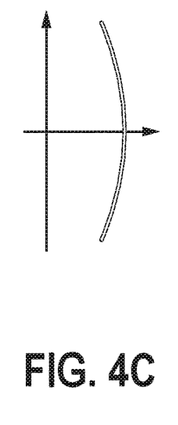
FIG. 4C shows a vertical cross-sectional view of the protective shield of FIG. 4A along line IVC-IVC in a vertical plane at a center of the protective shield.

However, at the same time, the proposed protective shield 10 can provide an arcuate lens portion 12 having an optically and structurally appropriate curvature in a central region of the lens as shown in FIG. 4C which is a vertical cross-sectional view along line IVC-IVC in FIG. 4A. This can make the shield structurally stronger and/or reduces optical distortion for the wearer 20. In the shown example, the vertical curvature decreases horizontally from a central region of the arcuate lens portion 12 towards a temporal side region in the as worn orientation.

Figure 5:
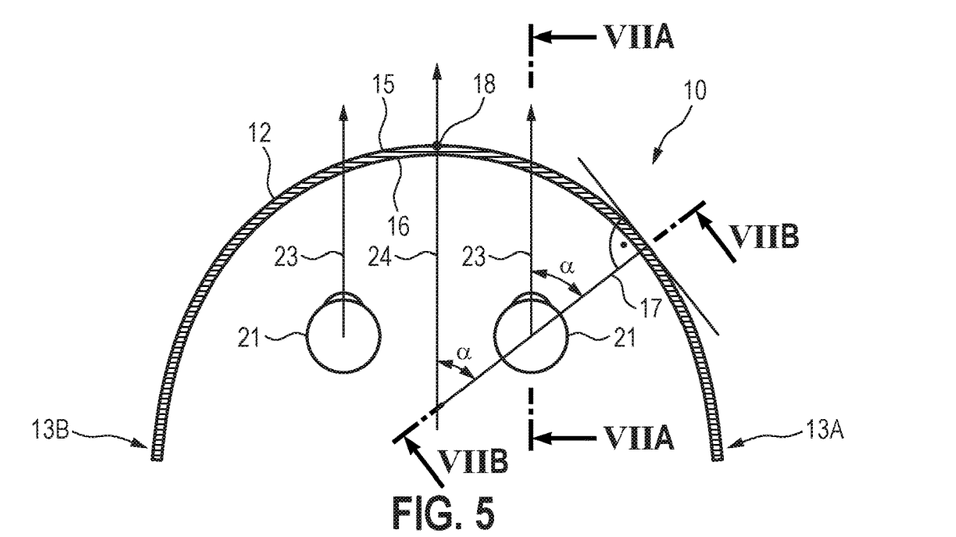
FIG. 5 shows a horizontal cross-sectional view of a protective shield according to a first exemplary embodiment of the present disclosure showing the front and back radii of curvature in the horizontal plane.

FIG. 5 shows a horizontal cross-sectional view of the protective shield 10 for mounting in front of a face of a wearer 20 in as worn orientation, with the shield extending across the eyes 21 and nose of the wearer 20, the protective shield comprising an arcuate lens portion 12 that, in the as worn orientation, curves across the eyes 21 and nose of the wearer 20, the arcuate lens portion having a first, horizontal curvature extending in a horizontal direction and a second, vertical curvature extending in a vertical direction, i.e. in a plane perpendicular to the horizontal plane as illustrated in FIG. 5. The arcuate lens portion is characterized in that the second vertical curvature is a horizontally varying vertical curvature. In particular, the vertical curvature varies horizontally along an intersection curve 15, 16 of the arcuate lens portion 12 and a horizontal plane, i.e. the image plane as shown in FIG. 5, which, in the as worn orientation, comprises the eyes 21 of the wearer. The intersection curve can refer to an intersection curve 15 of a front surface of the arcuate lens portion 12 and the horizontal plane. The intersection curve can also refer to an intersection curve 16 of a back surface of the arcuate lens portion 12 and the horizontal plane.

In the shown example, the vertical curvature of the arcuate lens portion 12 varies horizontally along the intersection curve 15 as a function of a horizontal angle α between a surface normal 17 of the arcuate lens portion 12 on the intersection curve 15 and a horizontal line of sight 23 of an eye 21 of the wearer in a primary position. The term primary position shall refer to a position of the eye 21 relative to the head, looking straight ahead at an object at eye level. The horizontal line of sight 23 of the wearer in a primary position can also be referred to as a normal line of sight (NLOS). The center line in the horizontal plane having the same distance to the normal lines line of sights 23 of the right and left eye 21 is denoted by reference numeral 24. It intersects the arcuate lens portion 12 at the vertex or center 18 of the arcuate lens portion 12.

It should be noted, that also if the surface normal 17 of the arcuate lens portion does not lie within the horizontal plane which, in the as worn orientation, comprises the eyes 21 of the wearer, the horizontal angle α can be determined. In this case, the horizontal angle is based on a projection of the surface normal 17 onto the horizontal plane which comprises the eyes of the wearer.

Figure 6:
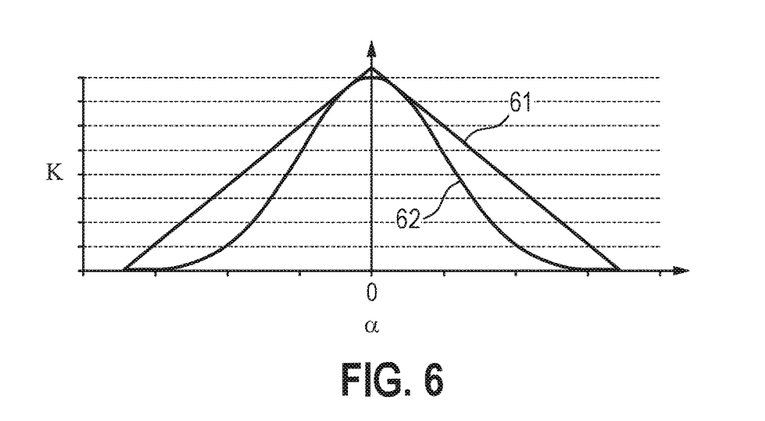
FIG. 6 shows an exemplary graph of horizontally varying vertical curvatures versus horizontal angle.

FIG. 6 shows a graph of the vertical curvature κ that varies horizontally with the horizontal angle α as denoted above. In FIG. 6, the horizontal axis denotes the horizontal angle α, whereas the vertical axis denotes the vertical curvature κ along in the intersection curve 15. The vertical curvature may vary horizontally as needed by a given application, for example, linearly to the right and/or left side as indicated by curve 61 or by a Gaussian shape as indicated by curve 62. The disclosure is of course not limited thereto.

Figure 7A:
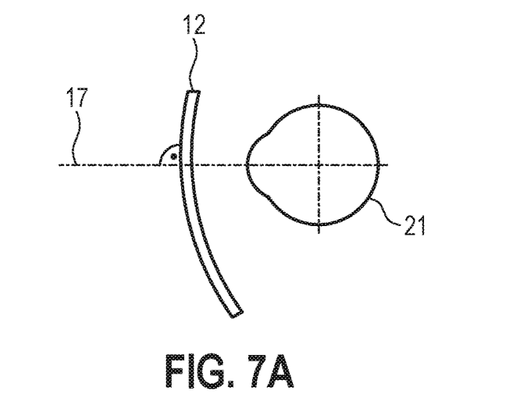
FIG. 7A shows a vertical cross-sectional view taken along line VIIA-VIIA in FIG. 5.
Figure 7B:
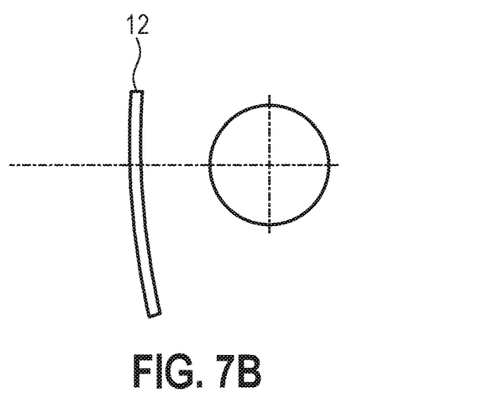
FIG. 7B shows a vertical cross-sectional view taken along line VIIB-VIIB in FIG. 5.

FIGS. 7A and 7B show vertical cross-sectional views of the arcuate lens portion 12 at different horizontal angles α. The view shown in FIG. 7A is a vertical cross-sectional view taken along line VIIA-VIIA in FIG. 5, whereas the view as shown in FIG. 7B is a vertical cross-sectional view taken along line VIIB-VIIB in FIG. 5. As can be seen by the comparison of the two figures, FIG. 7A shows a stronger vertical curvature. This curvature is advantageously configured to provide good impact protection in a central region of the arcuate lens portion 12 of the protective shield 10. In addition or in the alternative, the curvature can advantageously be configured to reduce optical distortion in particular compared to a cylindrical shield. The vertical curvature κ of the arcuate lens portion 12 decreases horizontally from the central region around center 18 towards the temporal sides 13A and 13B as can also be seen from FIG. 6 and as illustrated in FIG. 7B.

The vertical curvature κ at a horizontal position a on the intersection curve 15, 16 can refer to the curvature of the arcuate lens portion in a plane orthogonal to the horizontal plane, i.e. the horizontal plane which, in the as worn orientation, comprises the eyes 21 of the wearer as shown in FIG. 5, and containing the surface normal 17 of the arcuate lens portion 12 on the intersection curve 15, 16. This plane corresponds to the view as shown in FIG. 7A and FIG. 7B respectively for different horizontal positions on the intersection curve.

Figure 8:
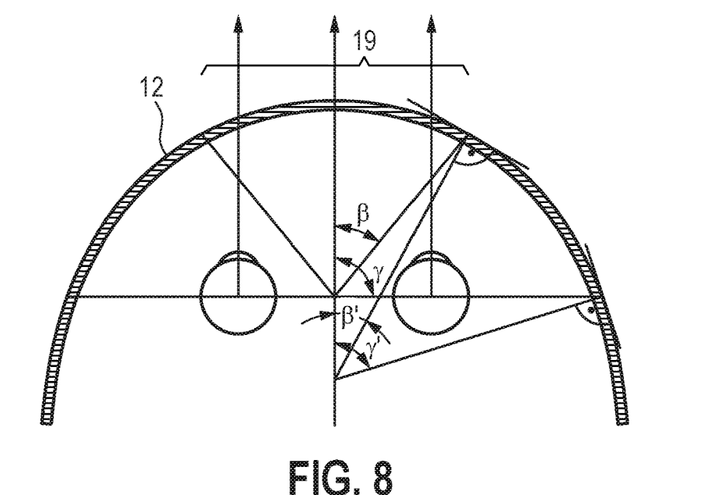
FIG. 8 shows a horizontal cross-sectional view of a protective shield according to a second exemplary embodiment of the present disclosure showing the front and back radii of curvature in the horizontal plane.

FIG. 8 shows a second example of a protective shield 10 comprising an arcuate lens portion 12 having a horizontally varying vertical curvature κ. The protective shield as shown in FIG. 8 may have some or all of the features described above with reference to FIG. 5. The following description will therefore only focus on differences and/or additional aspects.

Figure 9:
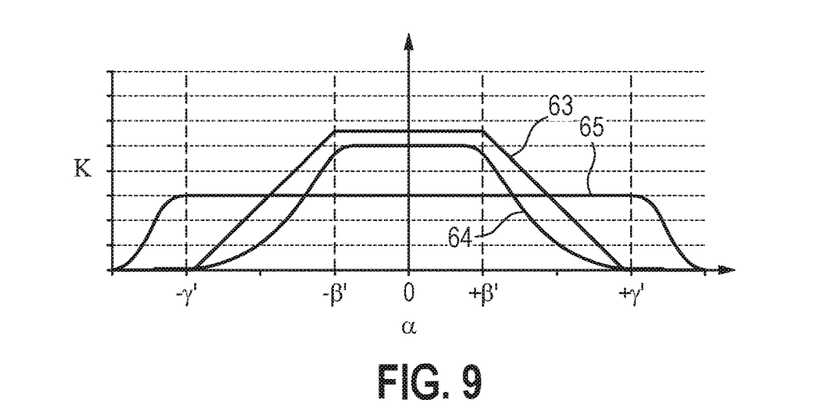
FIG. 9 shows a second exemplary graph of horizontally varying vertical curvatures versus horizontal angle.

In the protective shield 10 as shown in FIG. 8, the arcuate lens portion 12 comprises a central region 19 having a substantially constant vertical curvature κ as exemplarily illustrated by curves 63, 64 and 65 in FIG. 9. In the shown example, the central region 19 having the substantially constant vertical curvature stretches over an angular range of ±β. This angle can also be determined with respect to the center line 24. The angle can thus refer to an eye rotation angle of the wearer with respect to a straight ahead line of sight.

Furthermore, FIG. 8 also illustrates a field of view region of the wearer which spans an angular range of ±γ. The angle γ can again refer to an eye rotation angle of the wearer with respect to a straight ahead line of sight. For a healthy subject, the horizontal field of view of a wearer covers approximately a full angle of 180° to 200°. This corresponds to an angle γ with respect to the center line 24 of ±90° to ±100°. The angle γ of the horizontal field of view region as used herein is thus not measured with respect to the same vertex as the angle α. The latter is measured with respect to the surface normal of the arcuate lens portion. A line of sight of the eye does not necessarily hit the surface of the lens portion along the surface normal. Hence, the eye rotation angle γ corresponds to a horizontal angle γ' measured with respect to the surface normal of the arcuate lens portion 12. Correspondingly, the angle β in terms of eye rotation angle corresponds to a horizontal angle β' measured with respect to the surface normal of the arcuate lens portion 12. As can be seen from FIG. 8, the same horizontal location can thus be defined in terms of the angle with respect to the surface normal of the arcuate lens portion or in terms of the eye rotation angle. Hence, the curves in graphs as exemplarily shown in FIGS. 6 and 9 will bend at different angles as measured by the two different methods. This discrepancy can be advantageous since, for example, 90 degrees eye rotation angle might be only 75 degrees measured with respect to the surface normal, as illustrated in FIG. 8. This difference can be seen as a safety margin for changing the vertical curvature with no danger of affecting the optics seen by the wearer in a field of view as defined by the eye rotation angle. Since the eyes of the wearer, in an as worn orientation of the shield, sit in front of the center of curvature of the front and/or back surfaces a given eye rotation angle may correspond to a smaller angle measured with respect to the surface normal of the arcuate lens portion.

Referring again to FIG. 9, the vertical curvature κ can be constant within a field of view region of the wearer as indicated by the vertical dashed lines at angles ±γ' in FIG. 9. This is the case for arcuate lens portions 12 having a horizontally varying vertical curvature κ as exemplarily indicated by curves 63 and 64. However, in the alternative, the vertical curvature κ can also be constant over the entire field of view region of the wearer and then varies beyond the field of view as indicated by the vertical dashed lines at ±γ' in FIG. 9. An advantage of this exemplary embodiment of varying the vertical curvature κ only outside of a field of view region of the wearer, is that there is no need for complex optimal optimization to avoid image distortion. Nonetheless, optical optimization can also be provided in this case, in particular to give the wearer good peripheral vision during large eye turns and advantageously good looking optics all the way out to a temporal edge.

Figure 10:
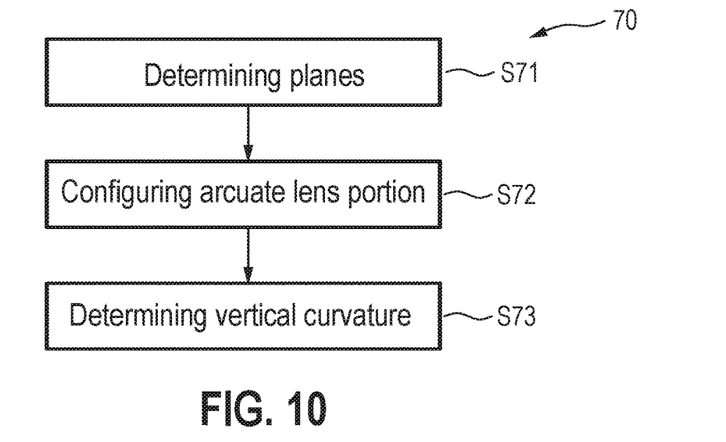
FIG. 10 shows a schematic flow chart of a method for designing a protective shield according to an aspect of the present disclosure.

FIG. 10 shows a schematic flow chart of a method, in particular a computer-implemented method for designing a protective shield for mounting in front of a face of a wearer in an as worn orientation, with the shield extending across the eyes and advantageously also across the nose of the wearer, wherein the shield comprises at least one arcuate lens portion. The method in its entirety is denoted by reference numeral 70.

In a first step S71 a vertical plane and a horizontal plane of the protective shield 12 in an as worn orientation are determined.

In a second step S72, the at least one arcuate lens portion 12 is designed such that, in the as worn orientation, it curves across an eye 21 of the wearer 20, the arcuate lens portion 12 having a first horizontal curvature extending in a horizontal direction and a second, vertical curvature κ extending in a vertical direction.

In a third step S73 the vertical curvature κ is determined such that the vertical curvature κ is a horizontally varying vertical curvature. In other words, the second vertical curvature as referred to in step S72 can refer to a vertical curvature at a center 18, 19 of the arcuate lens portion 12, for example at a vertex of the arcuate lens portion. A horizontal variation of the vertical curvature κ is thus determined in the subsequent step S73. For example, the vertical curvature κ at the center can be designed to be structurally appropriate to provide a high level of impact protection, whereas the vertical curvature κ at a different horizontal position, for example at a horizontal edge of the arcuate lens portion 12 can be designed to mate naturally with the helmet 1.

It should be noted that either a front or back surface may be specified and the other can be determined by optical considerations via optical optimization using an optics design software.

The difference between a conventional toroidal lens portion and a lens portion having a horizontally varying vertical curvature according to an aspect of the present disclosure will be illustrated in the following with respect to specific examples.

Figure 11:
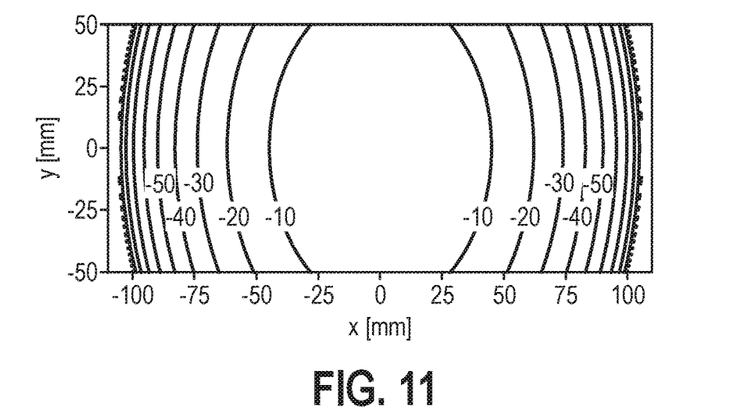
FIG. 11 shows a graph of a surface height of a toroidal surface of a toroidal lens portion in a Cartesian coordinate system.

FIG. 11 shows a graph of a toroidal surface of a conventional toroidal lens portion in a Cartesian coordinate system. The equation for the surface height of a section of a torus is given by $$z(x,y)=\sqrt{(R_x-R_y+\sqrt{R_y^2-y^2})^2-x^2}-R_x$$

where $R_x$ and $R_y$ are the radii of curvature along the x and y meridian respectively. An exemplary hockey shield can have a horizontal curvature of 5 diopters (Rx=530/5.0=106 mm)) and a vertical curvature of 2.5 diopters Ry=530/2.5=212 mm)). FIG. 11 maps the surface heights, expressed in millimeters, of such a surface. Negative values represent convex outward. In the as worn orientation, the x-axis refers to the horizontal axis, i.e., left-right direction; the y-axis refers to the vertical axis, i.e., down-up direction; and the z-axis refers to a depth axis, i.e. back-front direction. The same coordinate system will be used in the following description unless indicated otherwise.

Figure 12:
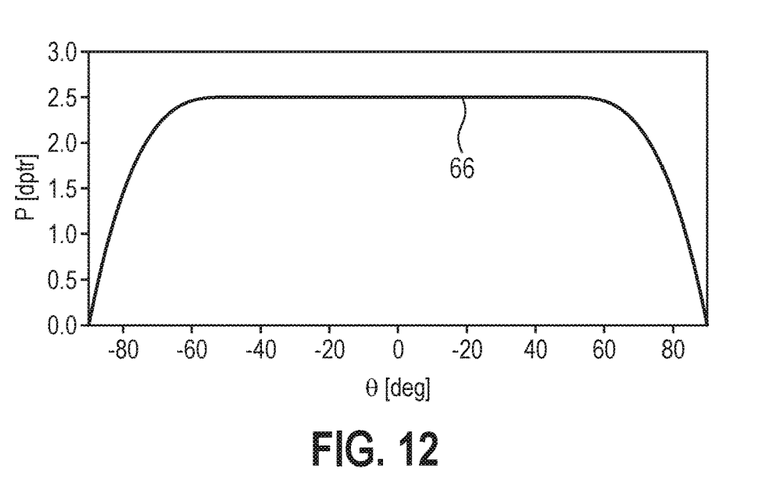
FIG. 12 shows a third exemplary graph of a horizontally varying vertical curvature versus horizontal angle.
Figure 13:
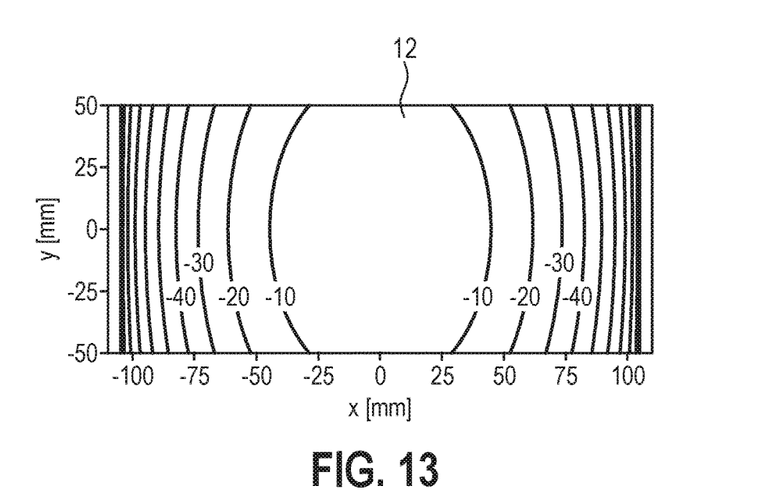
FIG. 13 shows a graph of a surface height of an exemplary arcuate lens portion having a horizontally varying curvature according to an aspect of the present disclosure in a Cartesian coordinate system.

Turning now to FIG. 12 and FIG. 13, these graphs illustrate an exemplary arcuate lens portion having a horizontally varying vertical curvature. Such a surface whose vertical curvature varies as a function of horizontal location/angle can be constructed in the following way. Let the surface height along the horizontal meridian x be $z_0(x)$. Then assume that at any location x the vertical height is a circular arc having a radius $R_y(x)$. The equation for the surface can then be described by $$z(x,y)=z_0(x)+\sqrt{R_y(x)^2-y^2}-R_y(x)$$

In the shown example, the surface height along the horizontal meridian $z_0(x)$ is chosen as a 5 diopter circle, so that the horizontal meridian of the new surface is the same as in the above exemplary torus of FIG. 11. In order to provide a protective shield having an arcuate lens portion that provides a curved center and flat edges, $R_y(x)$ is selected as a function that, typically smoothly, becomes infinite at the left and right edges of the shield. The vertical curvature can be described by a function P(θ) where P is dioptric power or curvature κ, so that R=530/P, and θ is the angle from the center of the arcuate lens portion to the horizontal x value, measured from a center of the 5 diopter horizontal meridian; i.e. x=106 sin$^{-1}$ θ, where the value 106 is the radius of the exemplary 5 diopter horizontal meridian. Hence, the task of defining $R_y(x)$ can be reduced to defining P(θ). FIG. 12 shows an exemplary graph of a horizontally varying vertical curvature versus horizontal angle as described by P(θ). The equation of the shown curve 66 is given by $$P(\theta) = \begin{cases} 2.5 & |\theta| \leq 50 \\ 2.5\left(1 - \frac{(|\theta|-50)^3}{(90-50)^3}\right) & |\theta| > 50 \end{cases}.$$

FIG. 13 shows the corresponding graph of a surface of an exemplary arcuate lens portion having the horizontally varying curvature of FIG. 12.

Figure 14:
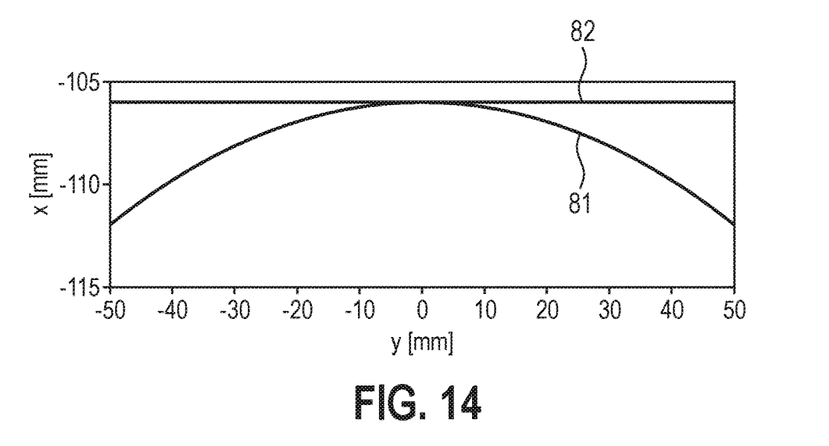
FIG. 14 shows a graph of a comparison of a vertical curvature at an edge region of a toroidal lens portion and an exemplary arcuate lens portion having a horizontally varying curvature.

FIG. 14 shows a comparison of a vertical curvature at an edge region of (a) the toroidal lens portion of FIG. 11 as indicated by curve 81 and (b) the exemplary arcuate lens portion having a horizontally varying curvature of FIG. 13 as indicated by curve 82. The graph of FIG. 14 thus illustrates the differences of the edge sections of the of the surface height graphs of FIG. 11 and FIG. 13, respectively, from which the different vertical curvatures at this horizontal position can be inferred.

A design object of a protective shield is also to provide excellent optics with a minimal amount of optical distortion. For a conventional toroidal shield, a design procedure can involve providing a front surface having a toroidal shape and also proving a back surface having a toroidal shape, but whose horizontal and vertical curvatures are adjusted to produce zero back vertex power at the center. For example, for a 3 mm thick lens portion with a 5 dptr×2.5 dptr (horizontal × vertical) front surface, a back 5.05 dptr×2.51 dptr back surface can be provided. For this example, it is assumed that the thickest (3 mm) part of the lens portion is at a geometric center. It should be noted that shifting the thickest point vertically can be done to provide zero vertical prismatic deflection for a desired predetermined line of sight in the as-worn position.

For an exemplary protective shield comprising an arcuate lens portion having a horizontally varying curvature with a front surface as described above with reference to FIG. 12 and FIG. 13, a low amount of optical distortion can be achieved by providing a back surface with $z_0(x)$ as a 5.05 dptr circle and using $$P(\theta) = \begin{array}{ll} 2.51 & |\theta| \leq 48.8 \\ 2.51\left(1 - \frac{(|\theta| - 48.8)^3}{(90 - 48.8)^3}\right) & |\theta| > 48.8 \end{array}.$$

This provides and exemplary arcuate lens portion whose inside edge and outside temporal edges at both sides are both vertically flat.

Figure 15:
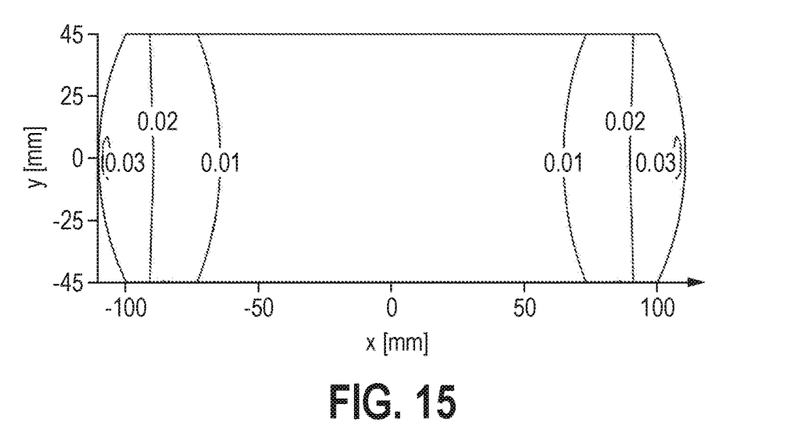
FIG. 15 shows a map of a back vertex power of an exemplary arcuate lens portion having a horizontally varying curvature.
Figure 16:
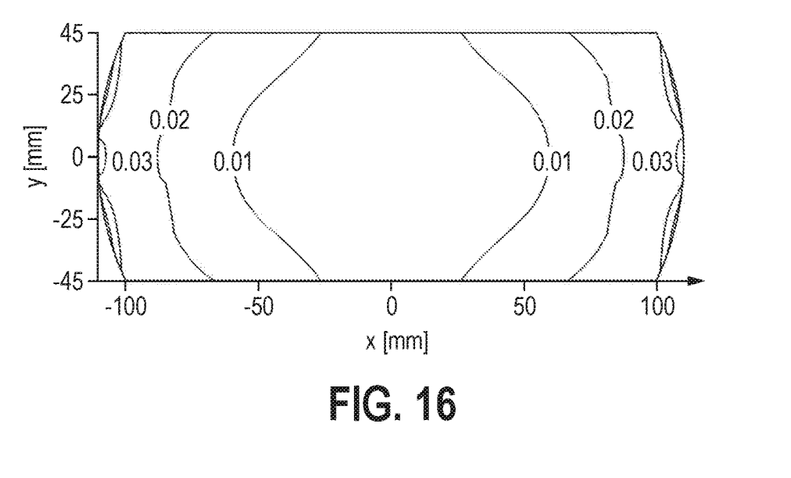
FIG. 16 shows a map of an astigmatism of an exemplary arcuate lens portion having a horizontally varying curvature.

FIG. 15 shows a map of a back vertex power of this exemplary an arcuate lens portion and FIG. 16 shows a map of a back vertex astigmatism. The horizontal extent in the given example covers a full semi-circle of the horizontal meridian. It should be noted that despite a rapid change in vertical curvature in the periphery of the shield, as illustrated by the curve 66 in FIG. 12, the optical power and astigmatism can be maintained at a level below a threshold of noticeable blur in the human eye and in particular well below common standards for optical devices. Hence, a very low amount of optical distortion can be provided with the protective shield comprising the arcuate lens portion having a horizontally varying vertical curvature as described herein.

It shall be understood the concepts disclosed herein may have wider application than just hockey visors which are cited herein for illustrative purposes. Any shield that connects to a helmet or frame, in particular at an extreme temple, can benefit from the proposed horizontal variation of a vertical curvature, in particular of a vertical flattening. For example, this concept can also be applied to ski goggles or can also be used on individual protective lenses. However, advantageously a protective shield having a single arcuate lens portion is provided that, in an as one orientation, curves across both eyes and advantageously also across the nose of the wearer.

While the disclosure has been illustrated and described in detail in the drawings and foregoing description, such illustration and description are to be considered illustrative or exemplary and not restrictive; the disclosure is not limited to the disclosed exemplary embodiments. Other variations to the disclosed exemplary embodiments can be understood and effected by those skilled in the art in practicing the claimed disclosure, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A protective shield mountable in front of a face of a wearer in an as worn orientation and extending across a field of view of the wearer, the protective shield comprising:
    an arcuate lens portion that is configured to curve across the field of view of the wearer, the arcuate lens portion having a horizontal curvature extending in a horizontal direction and a vertical curvature extending in a vertical direction; and
    left and right temporal side regions;
    wherein the horizontal curvature refers to the horizontal curvature of a front surface or a back surface of the arcuate lens portion, and the vertical curvature refers to the vertical curvature of the front surface or the back surface of the arcuate lens portion,
    wherein the vertical curvature is a horizontally varying vertical curvature,
    wherein the protective shield is configured to be worn with a protective helmet, the protective helmet having left and right temporal sides configured to receive the left and right temporal side regions, respectively,
    wherein the arcuate lens portion is a single arcuate lens portion which, in the as worn orientation, extends towards the left and right temporal sides of the protective helmet, respectively,
wherein the vertical curvature decreases horizontally from a central region of the arcuate lens portion towards at least one of the left and right temporal side regions, and
wherein the left and right temporal side regions have a vertical curvature greater than −0.5 dptr and smaller than +0.5 dptr.

2. The protective shield according to claim 1, wherein the arcuate lens portion is a plano or afocal lens portion.

3. The protective shield according to claim 1, wherein the vertical curvature varies horizontally along an intersection curve of the arcuate lens portion and a horizontal plane which, in the as worn orientation, is configured to include a position of the eye of the wearer.

4. The protective shield according to claim 3, wherein the vertical curvature is configured to vary horizontally along the intersection curve of the arcuate lens portion and the horizontal plane as a function of a horizontal angle in the horizontal plane.

5. The protective shield according to claim 3, wherein the vertical curvature at a horizontal position on the intersection curve of the arcuate lens portion and the horizontal plane is the curvature of the arcuate lens portion in a plane orthogonal to the horizontal plane and containing a surface normal of the arcuate lens portion on the intersection curve.

6. The protective shield according to claim 1, wherein the vertical curvature of the arcuate lens portion varies by at least 0.5 dptr.

7. The protective shield according to claim 1, wherein the vertical curvature of the arcuate lens portion varies linearly with an angle (α) or quadratic with the angle (α) or cubic with the angle (α).

8. The protective shield according to claim 1, wherein the arcuate lens portion further comprises a central region, and wherein the vertical curvature of the central region is constant.

9. The protective shield according to claim 1, wherein the vertical curvature is configured to vary horizontally within the field of view region of the wearer.

10. The protective shield according to claim 1, wherein the arcuate lens portion provides a maximum back vertex power $p_v$ of $-0.12$ dptr$<p_v<+0.12$ dptr.

11. The protective shield according to claim 1, wherein the arcuate lens portion provides a vertex power in a second principal meridian minus a vertex power in a first principal meridian of less than 0.12 dptr.

12. The protective shield according to claim 1, wherein the arcuate lens portion is made of at least one of a transparent impact resistant material and polycarbonate.

13. A protective helmet comprising the protective shield according to claim 1.

14. The protective helmet according to claim 13, being a sports helmet.

15. The protective helmet according to claim 13, being a hockey helmet.

16. A computer-implemented method for designing a protective shield mountable in front of a face of a wearer in an as worn orientation and extending across a field of view of the wearer, wherein the protective shield includes an arcuate lens portion and left and right temporal side regions, the method comprising:
 determining a vertical plane and a horizontal plane of the protective shield in an as worn orientation;
 configuring the arcuate lens portion to curve across the field of view of the wearer, the arcuate lens portion having a horizontal curvature extending in a horizontal direction and a vertical curvature extending in a vertical direction,
 wherein the horizontal curvature refers to the horizontal curvature of a front surface or a back surface of the arcuate lens portion and the vertical curvature refers to the vertical curvature of the front surface or the back surface of the arcuate lens portion;
 configuring the vertical curvature to be a horizontally varying vertical curvature;
 wherein the protective shield is configured to be worn with a protective helmet, the protective helmet having left and right temporal sides configured to receive the left and right temporal side regions, respectively, wherein the arcuate lens portion is a single arcuate lens portion that curves across the eye and a nose of the wearer and extends towards the left and right temporal sides of the helmet, respectively, and
 configuring the vertical curvature to decreases horizontally from a central region of the arcuate lens portion towards at least one of the left and right temporal side regions in the as worn orientation,
 wherein the left and right temporal side regions have a vertical curvature greater than $-0.5$ dptr and smaller than $+0.5$ dptr.

17. A computer program product comprising a program code for causing a computer to carry out the method as claimed in claim 16 when the computer program is carried out on the computer.

18. A machine readable storage medium having stored thereon a computer program comprising program code means for carrying out the method according to claim 16.

19. A protective shield mountable in front of a face of a wearer in an as worn orientation and extending across a field of view of the wearer, the protective shield comprising:
 an arcuate lens portion that is configured to curve across the field of view of the wearer, the arcuate lens portion having a horizontal curvature extending in a horizontal direction and a vertical curvature extending in a vertical direction; and
 left and right temporal side regions;
 wherein the horizontal curvature refers to the horizontal curvature of a front surface or a back surface of the arcuate lens portion and the vertical curvature refers to the vertical curvature of the front surface or the back surface of the arcuate lens portion,
 wherein the vertical curvature is a horizontally varying vertical curvature,
 wherein the protective shield is configured to be worn with a protective helmet, the protective helmet having left and right temporal sides configured to receive the left and right temporal side regions, respectively,
 wherein the arcuate lens portion is a single arcuate lens portion that extends towards the left and right temporal sides of the protective helmet, respectively,
 wherein the vertical curvature decreases horizontally from a central region of the arcuate lens portion towards at least one of the left and right temporal side regions, and
 wherein the left and right temporal side regions have a vertical curvature greater than $-0.25$ dptr and smaller than $+0.25$ dptr.

* * * * *